United States Patent
Kondo et al.

[11] Patent Number: 5,490,205
[45] Date of Patent: Feb. 6, 1996

[54] TELEPHONE SET FOR HANDLING A CALL

[75] Inventors: Takashi Kondo, Kasuya; Yuji Hirai, Fukuoka, both of Japan

[73] Assignee: Matsushita Electric Industrial Co., Ltd., Japan

[21] Appl. No.: 261,008

[22] Filed: Jun. 14, 1994

Related U.S. Application Data

[63] Continuation of Ser. No. 893,039, Jun. 3, 1992, abandoned.

[30] Foreign Application Priority Data

Jun. 4, 1991 [JP] Japan ................................. 3-132540
Jun. 4, 1991 [JP] Japan ................................. 3-132550
Jun. 4, 1991 [JP] Japan ................................. 3-132590

[51] Int. Cl.$^6$ .............................. H04M 1/64; H04M 1/27
[52] U.S. Cl. .................... 379/67; 379/142; 379/196; 379/199; 379/245; 379/375
[58] Field of Search .............................. 379/67, 88, 89, 379/142, 196, 199, 245, 374, 375, 249

[56] References Cited

U.S. PATENT DOCUMENTS

| | | | |
|---|---|---|---|
| 4,481,382 | 11/1984 | Villa-Real | 379/97 |
| 4,551,581 | 11/1985 | Doughty | 379/201 |
| 4,661,659 | 4/1987 | Nishimura | 379/61 |
| 4,924,496 | 5/1990 | Figa et al. | 379/199 |
| 4,942,598 | 7/1990 | Davis | 379/57 |
| 5,157,712 | 10/1992 | Wallen, Jr. | 379/199 |
| 5,200,994 | 4/1993 | Sasano et al. | 379/88 |
| 5,267,307 | 11/1993 | Izami et al. | 379/354 |

FOREIGN PATENT DOCUMENTS

3190494  8/1991  Japan .................................. 379/61

*Primary Examiner*—Jeffery A. Hofsass
*Assistant Examiner*—Fan Tsang
*Attorney, Agent, or Firm*—Parkhurst, Wendel & Rossi

[57] ABSTRACT

A telephone set provided with a telephone ringer for producing a ringing sound, a telephone number storing device for storing a telephone number of a specific party in response to a registration operation performed by a user, a telephone number detecting device for detecting telephone number data input from a telephone line and a control device for controlling and causing the ringer to produce a ringing sound when a telephone number indicated by the telephone number detected by the telephone number detecting device matches the telephone number stored in the telephone number storing device. Thereby, when the specific party phones the user, the user can easily know this. For example, if the user is going to concentrate his mind upon his work, or if the user is immersed in his work at a distance from the telephone set, the user can readily know whether or not a caller is the specific party, the telephone number of which is registered in the telephone set. Consequently, the telephone set can prevent the user from making an unnecessary response to a call given by a calling party other than the specific party.

3 Claims, 11 Drawing Sheets

TELEPHONE SET FOR HANDLING A CALL

This is a continuation of application Ser. No. 07/893,039 filed Jun. 3, 1992, now abandoned.

BACKGROUND OF THE INVENTION

1. Field of the Invention

This invention relates to a telephone set.

2. Description of the Related Art

Recently, a telephone set of a type, which receives data (hereunder referred to as calling phone number data) representing a telephone number (hereunder referred to as a calling phone number) of a calling subscriber sent from an exchange (namely, a central office) along with a ringing signal and displays a calling phone number indicated by the received calling phone number data, has been coming into wide use. When using a conventional telephone set of this type, a user (namely, a called party) can know from the indicated phone number who gives a call to the user (namely, who is a caller, namely, a calling subscriber), before a called phone handset becomes off-hook. Thus the user can judge whether or not he needs to respond to the call. Namely, the conventional telephone set of such a type has a merit in that it can save its user's trouble of reluctantly responding to unnecessary phone calls.

Figure 3:
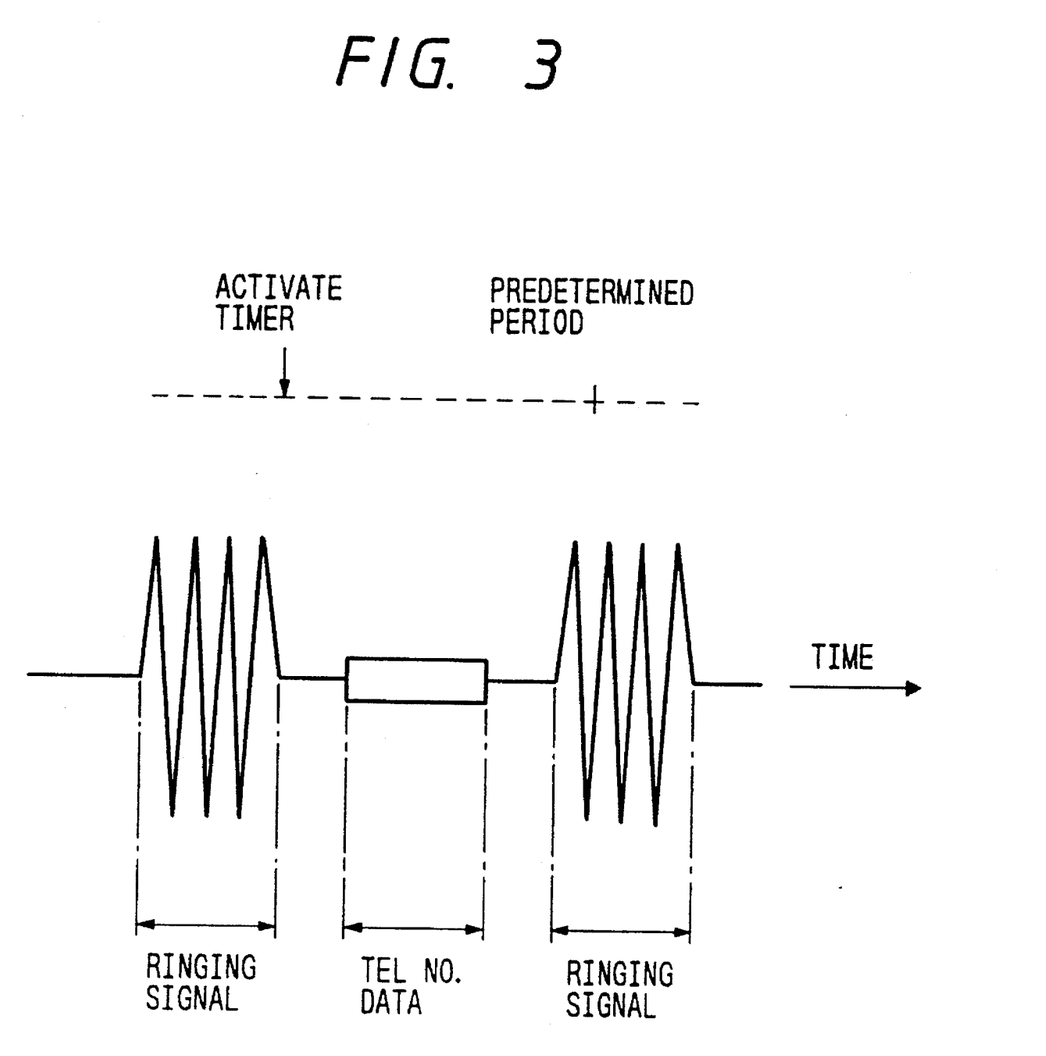
FIG. 3 is a timing chart for illustrating signals input from a telephone line to the telephone set of FIG. 1.

However, the conventional telephone set of such a type has drawbacks as will be described hereinbelow. Namely, in analog signals on an analog telephone line or circuit, a signal representing calling phone number data sent from a central office is inserted between intermittent ringing signals, as illustrated in FIG. 3. Therefore, a called phone rings for a moment in response to a ringing signal first sent from a central office. A ringing sound irritates and displeases a user (namely, a called party), for example, in case where he is going to concentrate his mind upon his work. If a call is given to a user by any caller to whom the user need not respond, a ring is not preferable even though the duration thereof is very short.

Even in case of employing a telephone set of the above described type which can display the phone number of a caller, a user cannot readily know who is a caller, if the user is immersed in his work at a distance from the telephone. Namely, the user cannot see the displayed phone number of the caller if he does not come up to the called phone. This is very troublesome to the user. The present invention is created to eliminate such drawbacks of the conventional telephone set.

SUMMARY OF THE INVENTION

It is, therefore, an object of the present invention to provide a telephone set which preliminarily stores a phone number of a specific party, who is important to a user thereof, and generates a special ring when a phone number of a caller input from a telephone circuit connected thereto matches the stored phone number, whereby a user can readily know whether or not a caller is important to him.

To achieve the foregoing object, in accordance with an aspect of the present invention, there is provided a telephone set which comprises a ringing means for producing a ringing sound, a telephone number storing means for storing a telephone number of a specific party in response to a registration operation performed by a user, a telephone number detecting means for detecting telephone number data input from a telephone line and a control means for controlling and causing the ringing means to produce a ringing sound when a telephone number indicated by the telephone number detected by the telephone number detecting means matches the telephone number stored in the telephone number storing means.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

Figure 1:
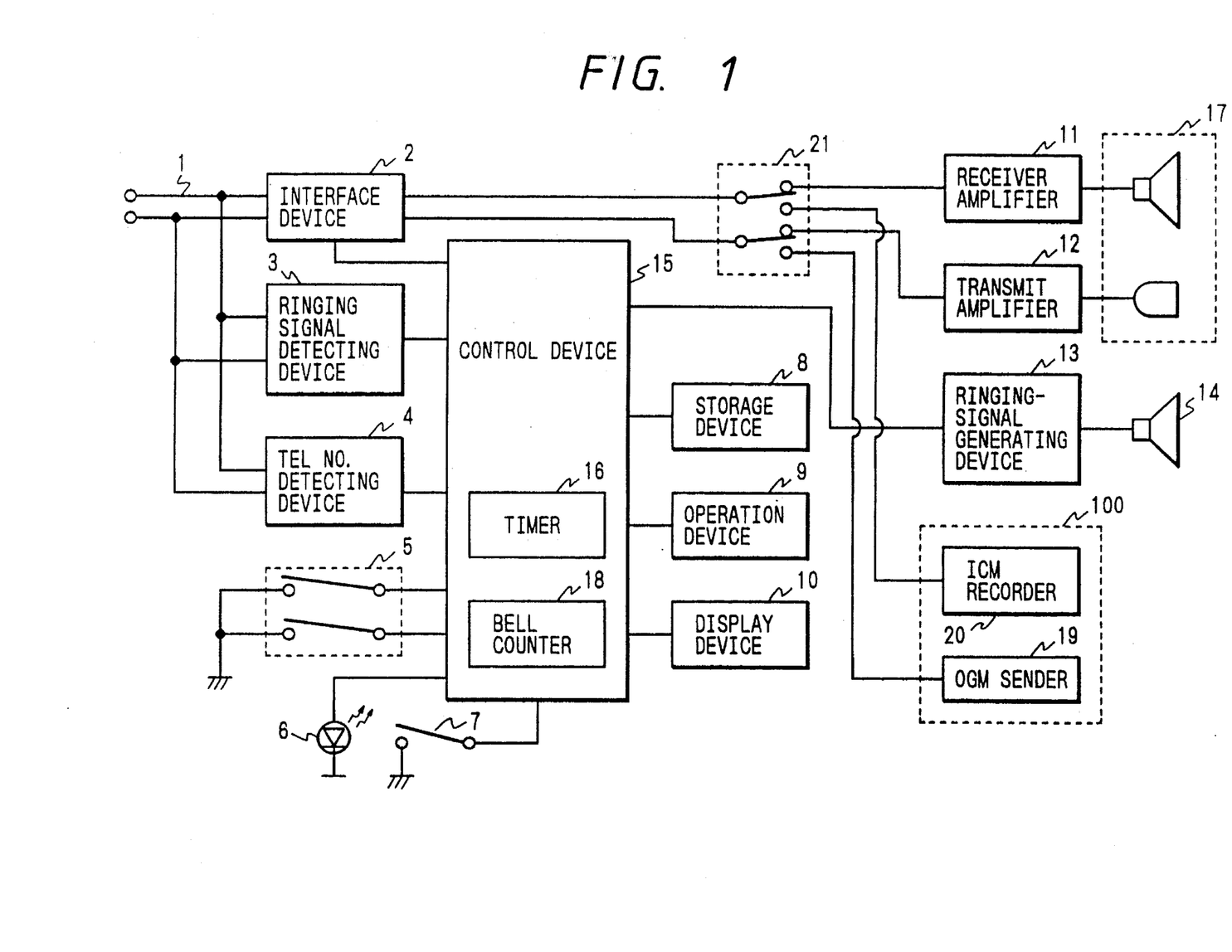
FIG. 1 is a schematic block diagram for illustrating the configuration of a telephone set (hereunder sometimes referred to as a first embodiment) embodying the present invention.

FIG. 1 is a schematic block diagram for illustrating the configuration of a telephone set (namely, a first embodiment) embodying the present invention. Further, FIGS. 2(A) to 2(D) are flowcharts of a program for performing an operation of the telephone set of FIG. 1.

In FIG. 1, reference numeral 1 designates telephone lines; 2 an interface device between the telephone line and the telephone set; 3 a ringing-signal detecting device; and 4 a telephone number detecting device. The composing elements 2 to 4 are connected to the telephone lines 1. Moreover, reference numeral 5 denotes a mode changing switch for changing a mode of an operation of a ringing-sound generating device 13 between an all-incoming-call responding mode, in which the same ringing sound is generated in response to every incoming call, and a specific-caller discriminating mode, in which a ringing sound is generated only when one of specific callers gives a call to this telephone set, and for changing a state of a telephone-answering-machine portion 100 (to be described later) between a wait state (namely, a waiting state) and a non-wait state. Incidentally, the telephone-answering-machine portion (hereunder sometimes referred to simply as the answering portion) 100 is operative to respond to a call in the user's absence and play a preliminarily recorded answering message (hereunder sometimes referred to as an outgoing message) from the user and then record a message (hereunder sometimes referred to as an incoming message) from a caller before disconnecting. Furthermore, reference numeral 6 represents a light emitting diode (hereunder abbreviated as an LED); 7 a hook-switch; 8 a storage device for storing telephone number data and so on; 9 an operation unit such as a keyboard; and 10 a display device for displaying various information by means of characters (incidentally, a liquid crystal display is employed as the display device).

Further, reference numeral 11 denotes a receiver amplifier; 12 a transmit amplifier; 14 a loudspeaker; 15 a control device formed by a microcomputer; 16 a timer built in the control device 15; and 17 a handset which is connected to the receiver amplifier 11 and the transmit amplifier 12.

Moreover, reference numeral 18 designates a bell counter built in the control device 15; 19 an OutGoing Message sending device (hereunder referred to simply as an OGM sender) of the answering portion 100; and 20 an InComing Message recording device (hereunder referred to as an ICM recorder) of the answering portion 100.

Hereinafter, an operation of the telephone set having the above described configuration will be described in detail. Incidentally, it is assumed that data indicating telephone numbers of specific parties, who are important to the user of the telephone set, is preliminarily input from the operation unit 9 and then such input data is stored in the storage device 8.

First, regarding a case where the mode changing switch 5 is in the all-incoming-call responding mode and moreover the answering portion 100 is in a wait state, an operation of the telephone set will be described hereinbelow by referring to FIGS. 2(A) to 2(D).

Figure 2A:
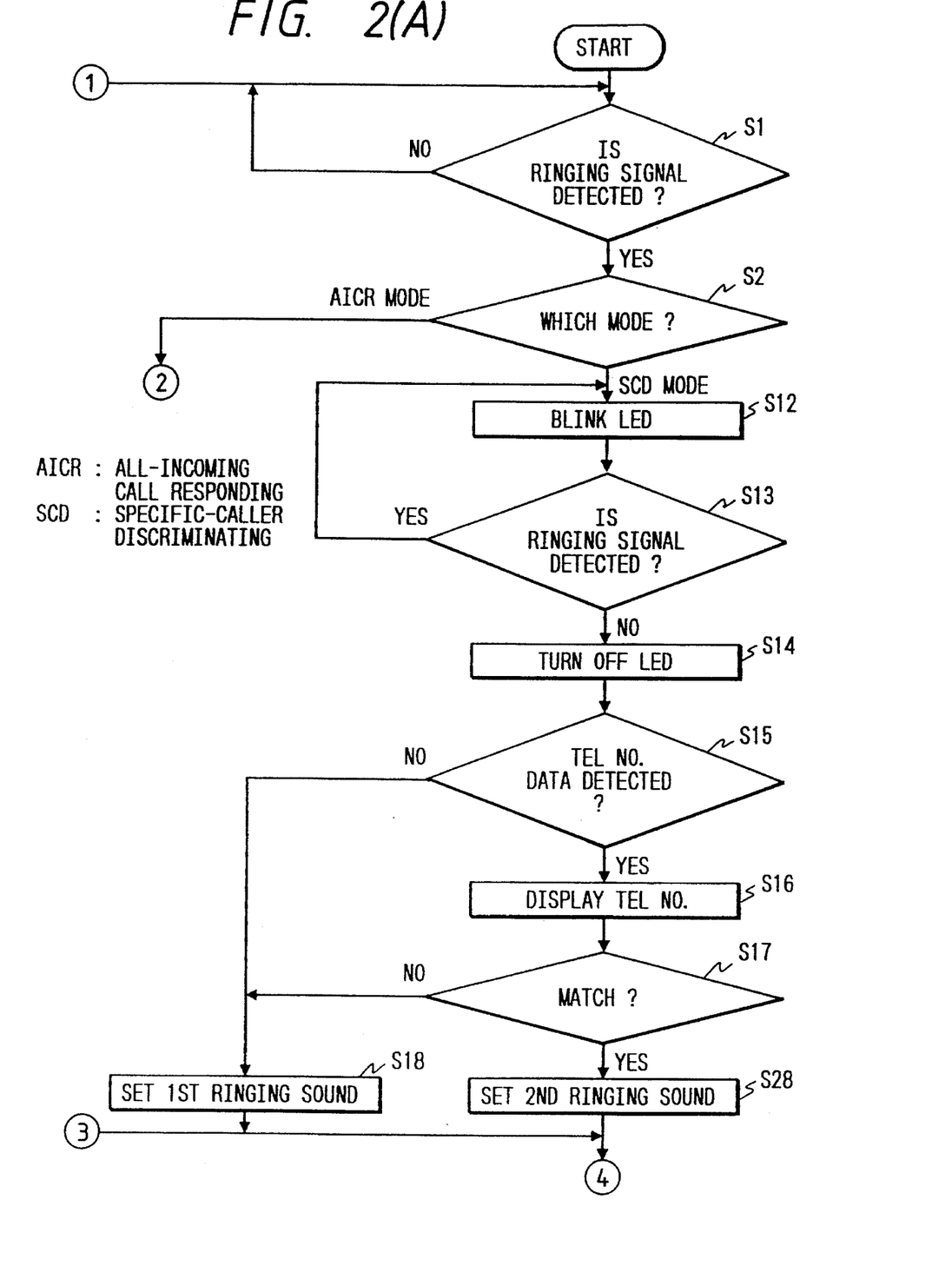
FIGS. 2(A) to 2(D) are flowcharts of a program for performing an operation of the telephone set of FIG. 1.

When a ringing signal as illustrated in FIG. 3 is input from the telephone line 1, the ringing-signal detecting device 3 detects the input ringing signal and then outputs information regarding the detected ringing signal to the control device 15 in step S1. Next, in step S2, the control device 15 notices that the switch 5 is in the all-incoming-call responding mode. Thus the control device 15 causes the LED 6 to blink in step S3. Moreover, the control device 15 causes the ringing-sound generating device 13 to produce a ringing sound in step S4.

Subsequently, in step S5, the control device 15 detects from a signal output from the ringing signal detecting device 3 whether or not a ringing signal is still input to the telephone set. If still input to the telephone set, the control device 15 keeps the LED 6 blinking and the ringing-sound generating device 13 producing ringing sounds.

In contrast, if, in step S5, the control device 15 detects that a ringing signal is not input to the telephone set, the device 15 turns off the LED 6 in step S6 and further stops the generation of a ringing sound in step S7. In addition, the control device 15 adds 1 to a value indicated by the bell counter 18 in step S8.

Next, when telephone number data is input from the telephone line 1, the telephone number data detecting device 4 detects the input telephone number data and then outputs the detected telephone number data to the control device 15 in step S81. The control device 15 causes the display device 10 to display a number indicated by the detected telephone number data in step S9.

However, in case where this service is not provided by an exchange corresponding to a calling phone, no telephone number data is input to the telephone set (namely, the called phone). Therefore, the telephone number data detecting device 4 does not detect any telephone number data. Consequently, no telephone number is displayed by the display device.

Next, the control device 15 detects a response made by the user of the telephone set. Namely, in step S10, the control device 15 detects whether or not the telephone set is made by the user to be off-hook, by detecting whether or not a signal output from the hook-switch 7 is present. In case where the off-hook condition of the telephone set is detected, the control device 15 resets the bell counter 18 in step S29. Further, the control device 15 causes the interface device 2 to make line connection (namely, establish the connection between the calling and called phones through the telephone line 1). Thus, in step S11, the telephone set becomes in a busy condition in which the handset 17 is used, namely, lifted from its mounting.

In case where the off-hook condition of the telephone set is not detected in step S10, the control device 15 determines in step S30 whether or not a value indicated by the bell counter 18 reaches a predetermined number of times. If not reach the predetermined number of times, the program goes back to step S1. Thereafter, if a ringing signal is input and detected posterior to the signal indicating the telephone number data, the above-mentioned process will be performed again.

In case where the value indicated by the bell counter 18 reaches the predetermined number of times in step S30, the answering portion 100 is activated. Namely, the control device 15 first causes the interface device 2 to make the line connection in step S31. Then, a speech channel is switched or connected to the answering portion 100. Further, the control device 15 makes the OGM sender 19 output an OGM in step S32. Upon completion of outputting the OGM, the control device 15 makes the ICM recorder 20 record an ICM input from the telephone line 1 in step S33. After the recording of the ICM is finished in step S34, the control device 15 resets the bell counter 18 in step S35 and then causes the interface device 2 to release the line connection (namely, release the telephone line 1) in step S36.

Next, regarding another case where the mode changing switch 5 is in the specific-caller discriminating mode and moreover the answering portion 100 is in a wait state, an operation of the telephone set will be described hereinbelow.

Figure 2B:
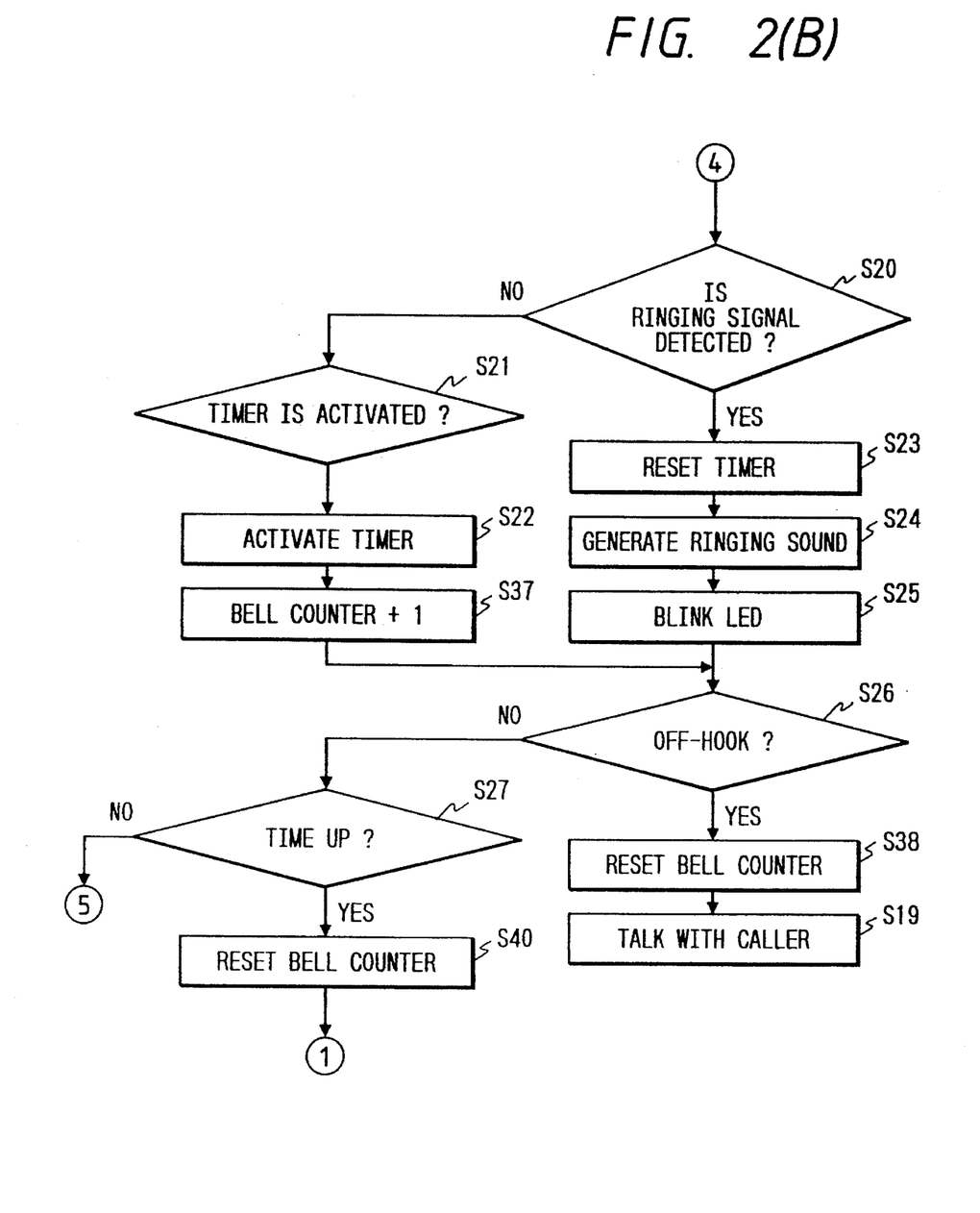

First, when a ringing signal as illustrated in FIG. 3 is input from the telephone line 1, the ringing-signal detecting device 3 detects the input ringing signal and subsequently outputs information regarding the detected ringing signal to the control device 15 in step S1. Then, in step S2, the control device 15 notices that the switch 5 is in the specific-caller discriminating mode. Thus the control device 15 causes the LED 6 to blink in step S12.

Subsequently, in step S13, the control device 15 detects from a signal output from the ringing signal detecting device 3 whether or not a ringing signal is still input to the telephone set. If still input to the telephone set, the control device 15 keeps the LED 6 blinking. However, if it is detected in step S13 that the control device 15 detects that a ringing signal is not input to the telephone set, the device 15 turns off the LED 6 in step S14.

Next, when telephone number data is input from the telephone line 1, the telephone number data detecting device 4 detects the input telephone number data and then outputs the detected telephone number data to the control device 15 in step S15. The control device 15 then causes the display device 10 to display a number indicated by the detected telephone number data in step S16. Moreover, in step S17, the control device 15 determines whether or not the detected telephone number data matches the telephone number data preliminarily stored in the storage device 8.

In case where the detected telephone number data does not match the preliminarily stored telephone number data, or where no telephone number data is input, for example, by reason that the exchange corresponding to the calling party does not provide this service, the control device 15 sets a first ringing sound in the ringing-sound generating device 13 in step S18. Thereafter, in step S20, the ringing signal detecting device 3 detects whether or not the next ringing signal is input thereto.

Figure 2C:
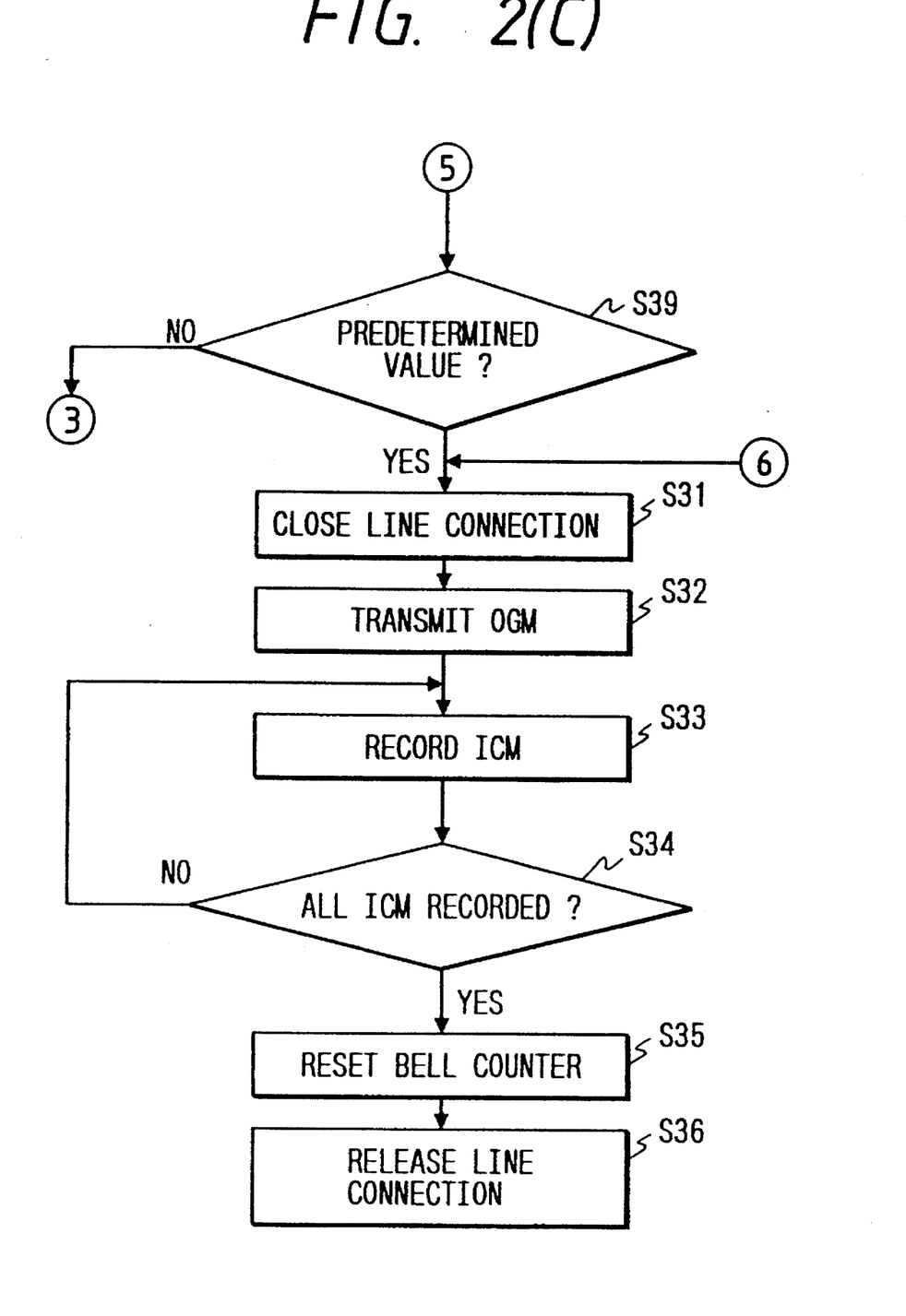

If no ringing signal is detected in step S20, the program advances to step S21 whereupon it is determined whether or not the timer 16 has been already activated. If it is detected in step S21 that the timer 16 is not activated yet, the timer 16 is activated in the next step S22. Then, in step S37, 1 is added to a value indicated by the bell counter 18. Subsequently, the program advances to step S26 whereupon it is judged from the presence or absence of a signal sent from the hook-switch 7 whether or not the handset 17 is made by the user to be off-hook. If the off-hook condition of the handset is detected, the bell counter 18 is reset in step S38. Thus, in step S18, the telephone set becomes in a busy condition in which the handset 17 is used.

In contrast, if the off-hook condition of the handset is not detected in step S26, it is then judged in step S27 whether or not a period of time set in the timer 18 has expired. If such a period of time has not elapsed, it is then determined in step S39 whether or not the value indicated by the bell counter 18 reaches the predetermined number of times. If the bell counter's value does not reach the predetermined number, the program goes back to step S20.

Subsequently, in step S20, it is judged whether or not the next ringing signal is input to the telephone set, as above stated. If not input thereto yet, it is judged in step S21 whether or not the timer 16 has been already activated. In this case, the timer 16 has been already activated. Therefore, the program advances from step S21 to step S27 through step S26.

If it is detected in step S27 that the period of time set in the timer 16 expires, the control device 15 judges that the caller hangs up the handset 17, and resets the bell counter 18 in step S40. Then the program goes back to step S1.

Incidentally, if a ringing signal is detected in step S20, the timer 16 is reset in step S23. Further, the control device 15 causes the ringing-signal generating device 13 to generate a first ringing signal in step S24, and makes the LED 6 blink in step S25. The process comprised of steps S24 and S25 is continuously performed while ringing signals are input to the telephone set. Thereafter, if the off-hook condition of the handset is detected in step S26, the bell counter 18 is reset and thus the telephone set becomes in a busy state.

Thus, in case where no ringing signal is detected in step S20, 1 is added in step S37 to the value indicated by the bell counter 18 every time the timer is activated in step S21, namely every time a pause period between ringing signals is detected. Further, if it is detected in step S39 that the value indicated by the bell counter 18 reaches the predetermined number of times, the control device 15 first causes the interface device 2 to make the line connection in step S31. Further, the control device 15 makes the OGM sender 19 output an OGM in step S32.

After the OGM is sent from the sender 19, upon completion of outputting the OGM, the control device 15 makes the ICM recorder 20 record an ICM input from the telephone line 1 in step S33. Upon completion of the recording of the ICM in step S34, the control device 15 resets the bell counter 18 in step S35 and then makes the interface device 2 release the line connection (namely, release the telephone line 1) in step S36.

Additionally, regarding a case where the detected telephone number data matches the telephone number data stored in the storage device 8, an operation of the telephone set will be described hereinbelow.

Figure 2D:
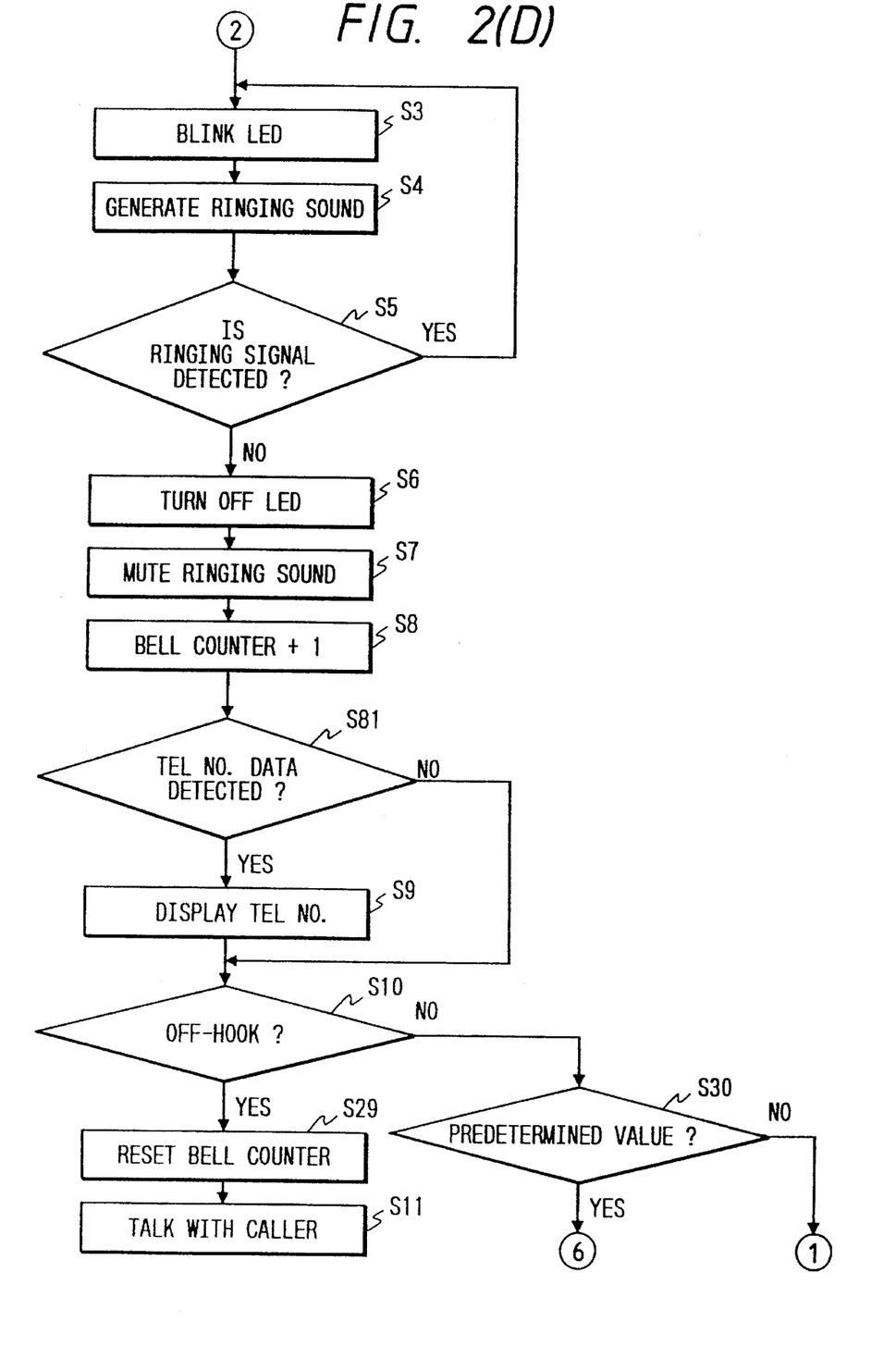

Namely, if it is detected in step S17 that the detected telephone number data matches the preliminarily stored telephone number data, the control device 15 sets a second ringing sound in the ringing-sound generating device 13 in step S28. Thereafter, the process consisting of the steps following step S20 is performed. Thus, if a ringing signal is detected, the second ringing sound is generated. Further, in this case, the answering portion starts operating when the bell counter's value reaches the predetermined number of times, similarly as in the above described case.

As described above, this embodiment (namely, the telephone set) does not respond to a first ringing sound in case where the mode changing switch is in the specific-caller discriminating mode. Thus this embodiment does not generate a ringing sound until telephone number data is detected. Namely, this embodiment can prevent the generation of a ringing sound until telephone number data is sent from the exchange (or the central office) thereto. Consequently, this embodiment can prevent the user from making an unnecessary response to a call given by a caller other than the specific caller.

Hereinafter, a cordless telephone (namely, the second embodiment) of the present invention will be described in detail by referring to FIGS. 4 to 6.

Figure 4:
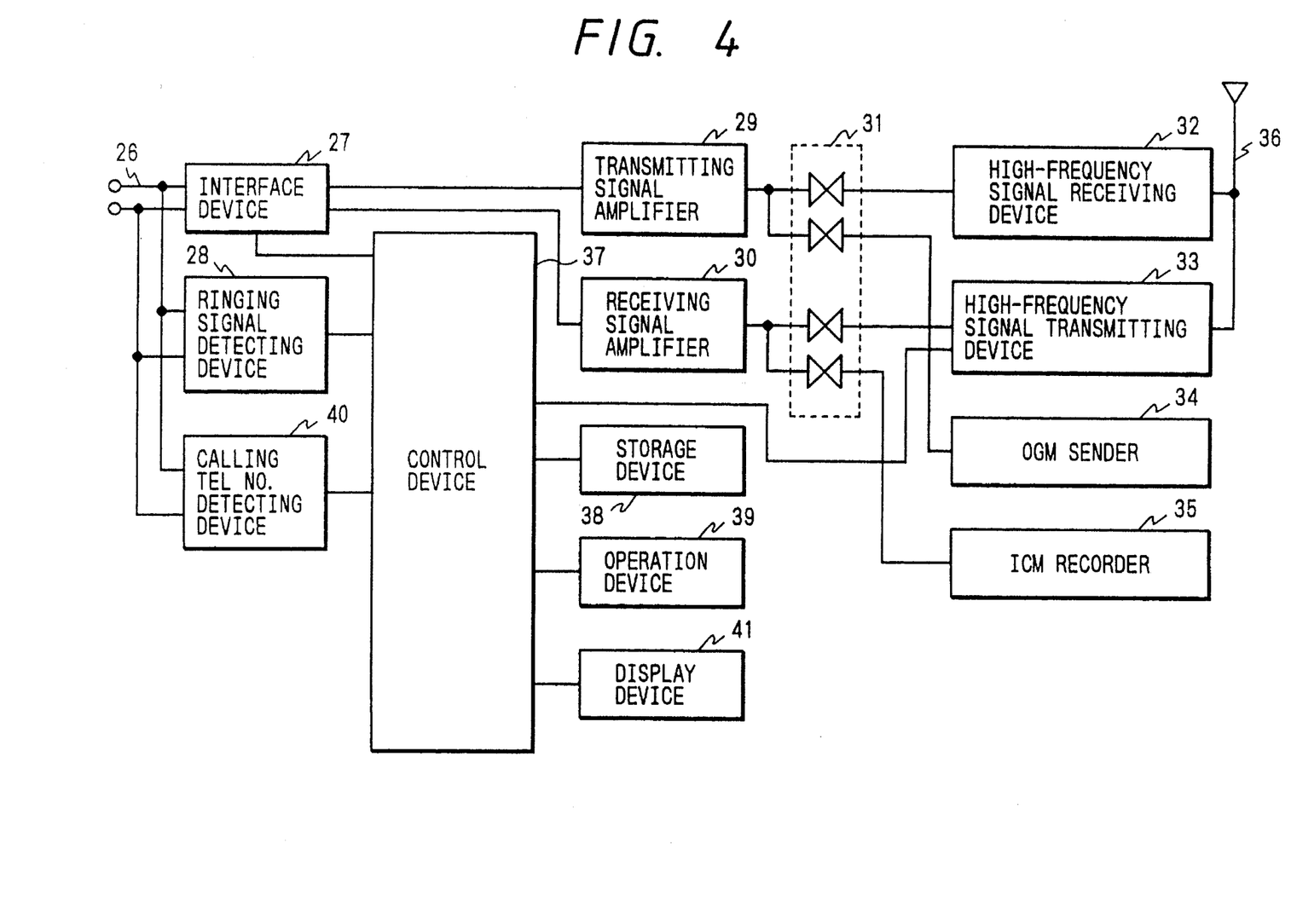
FIG. 4 is a schematic block diagram for illustrating the configuration of a base unit (namely, a fixed unit) of a telephone set (hereunder sometimes referred to as a second embodiment) embodying the present invention.

FIG. 4 is a schematic block diagram for illustrating the configuration of a base unit (namely, a fixed unit) of the cordless telephone (namely, the second embodiment). FIG. 5 is a schematic block diagram for illustrating the configuration of a portable unit (namely, a mobile unit) of the second embodiment. FIGS. 6(A), 6(B) and 6(C) are flowcharts for illustrating an operation of the second embodiment.

In FIG. 4, reference numeral 26 designates telephone lines; 27 an interface device connected to the telephone lines 26; 28 a ringing-signal detecting device connected to the telephone lines 26; 29 a transmitting-signal amplifier; and 30 a receiving-signal amplifier. The transmitting-signal amplifier 29 and the receiving-signal amplifier 30 are connected to the interface device 27. Reference numeral 31 denotes a switch portion composed of analog switches; 32 a high-frequency signal receiving device; 33 a high-frequency signal transmitting device; and 34 an OGM sender; 35 an ICM recorder. The high-frequency signal receiving device 32, the high-frequency signal transmitting device 33, the OGM sender 34 and the ICM recorder 35 are connected to the switch portion 31. Further, reference numeral 36 represents an antenna connected to the high-frequency signal receiving device 32 and the high-frequency signal transmitting device 33; and 37 a control device formed by a microcomputer.

Moreover, reference numeral 38 designates a storage device; and 39 an operation device. These devices 38 and 39 are connected to the control device 37. Furthermore, reference numeral 40 denotes a calling-telephone-number detecting device for detecting a telephone number of a calling phone sent from a central office through the telephone line 26; and 41 a display device connected to the control device 37 for displaying a telephone number detected by the detecting device 40.

Figure 5:
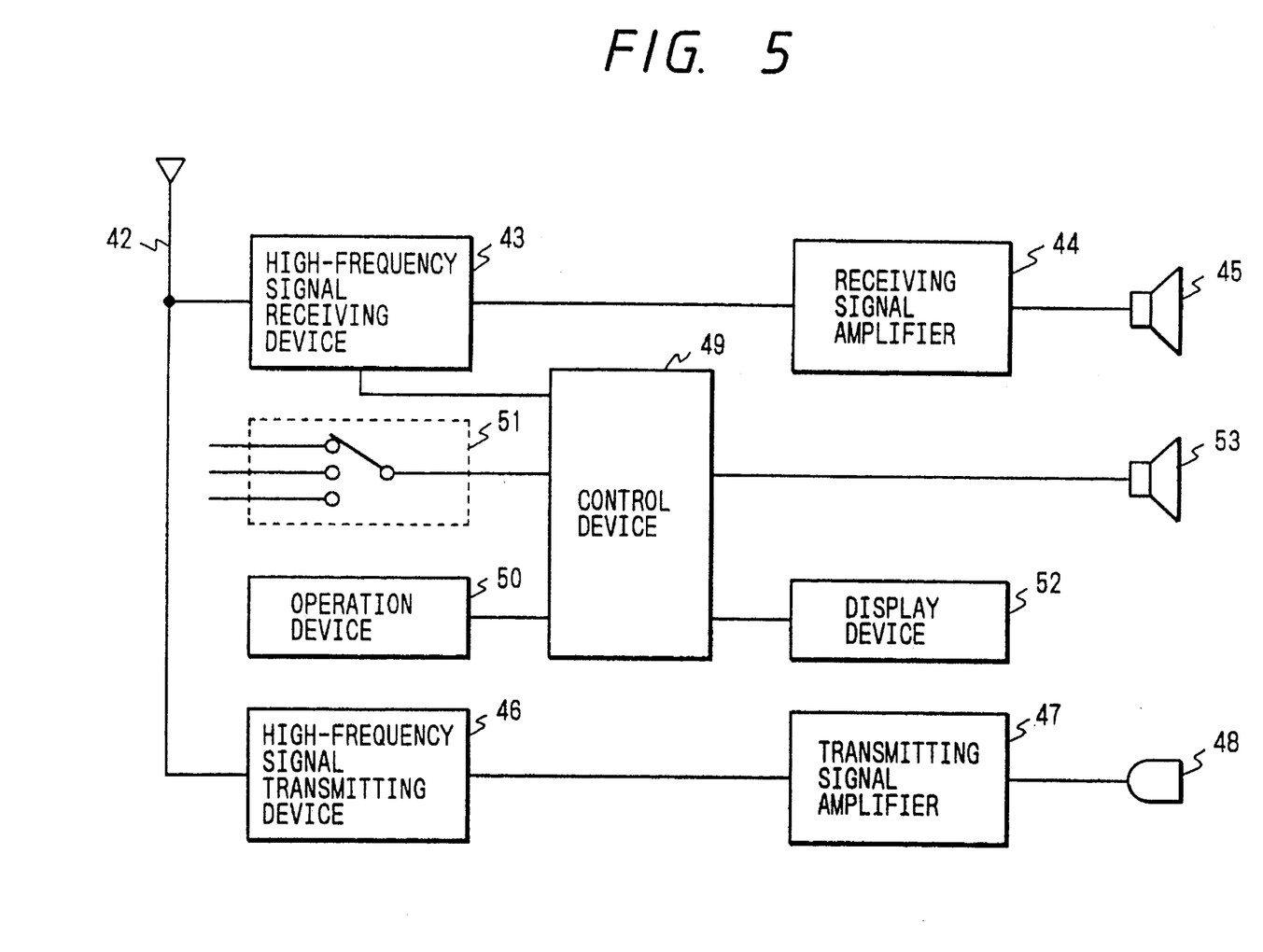
FIG. 5 is a schematic block diagram for illustrating the configuration of a portable unit (namely, a mobile unit) of the second embodiment.
Figure 6A:
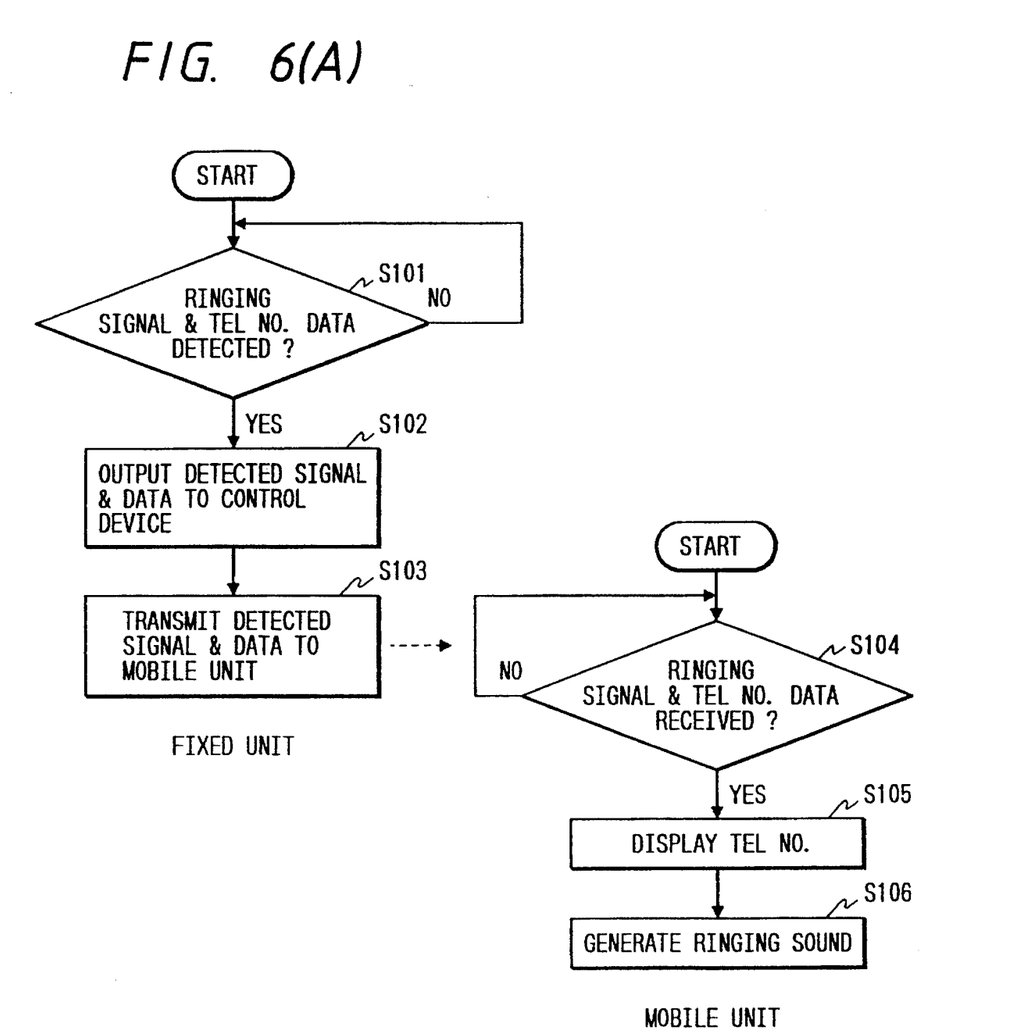
FIGS. 6(A), 6(B) and 6(C) are flowcharts for illustrating an operation of the second embodiment.
Figure 6B:
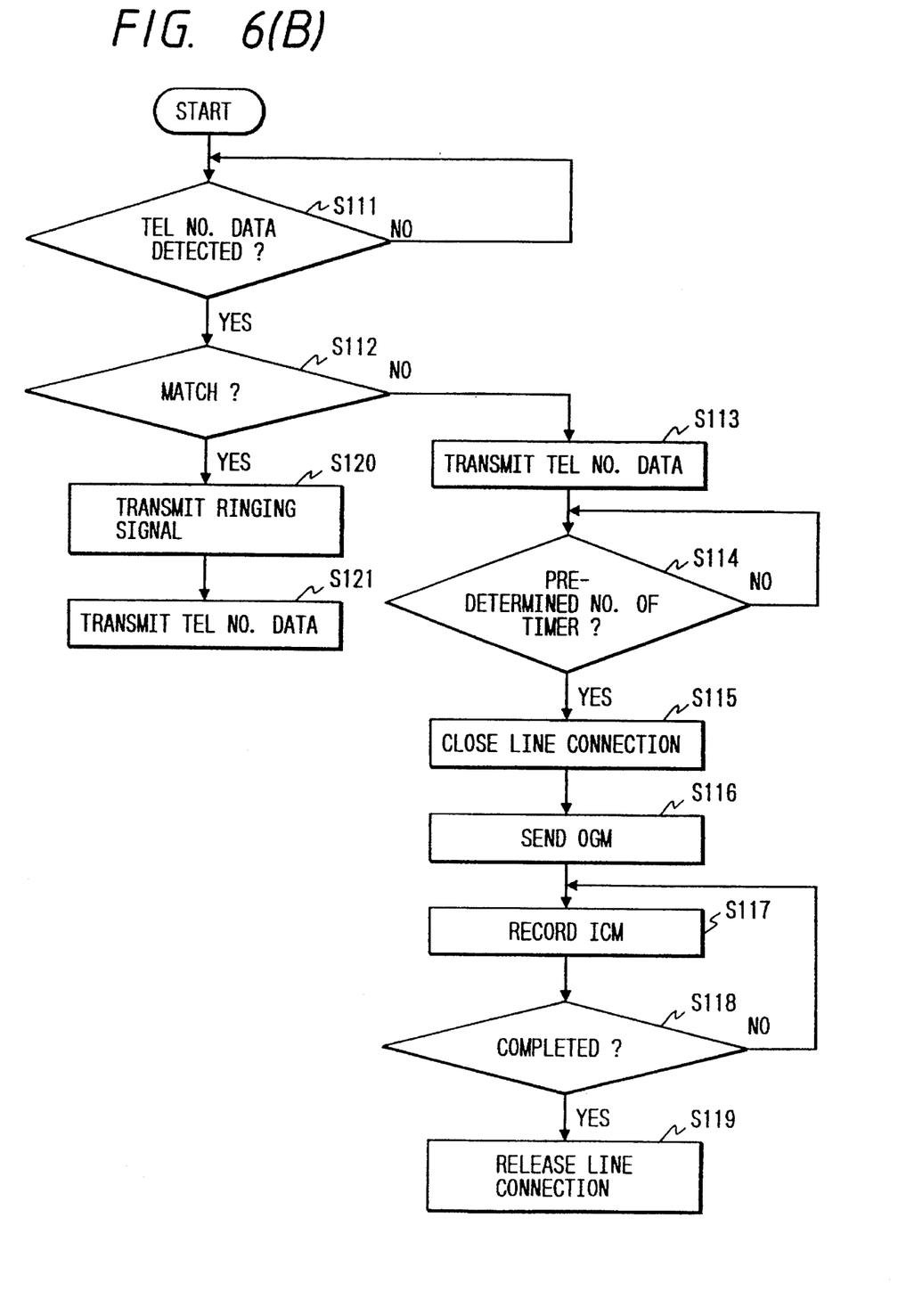
Figure 6C:
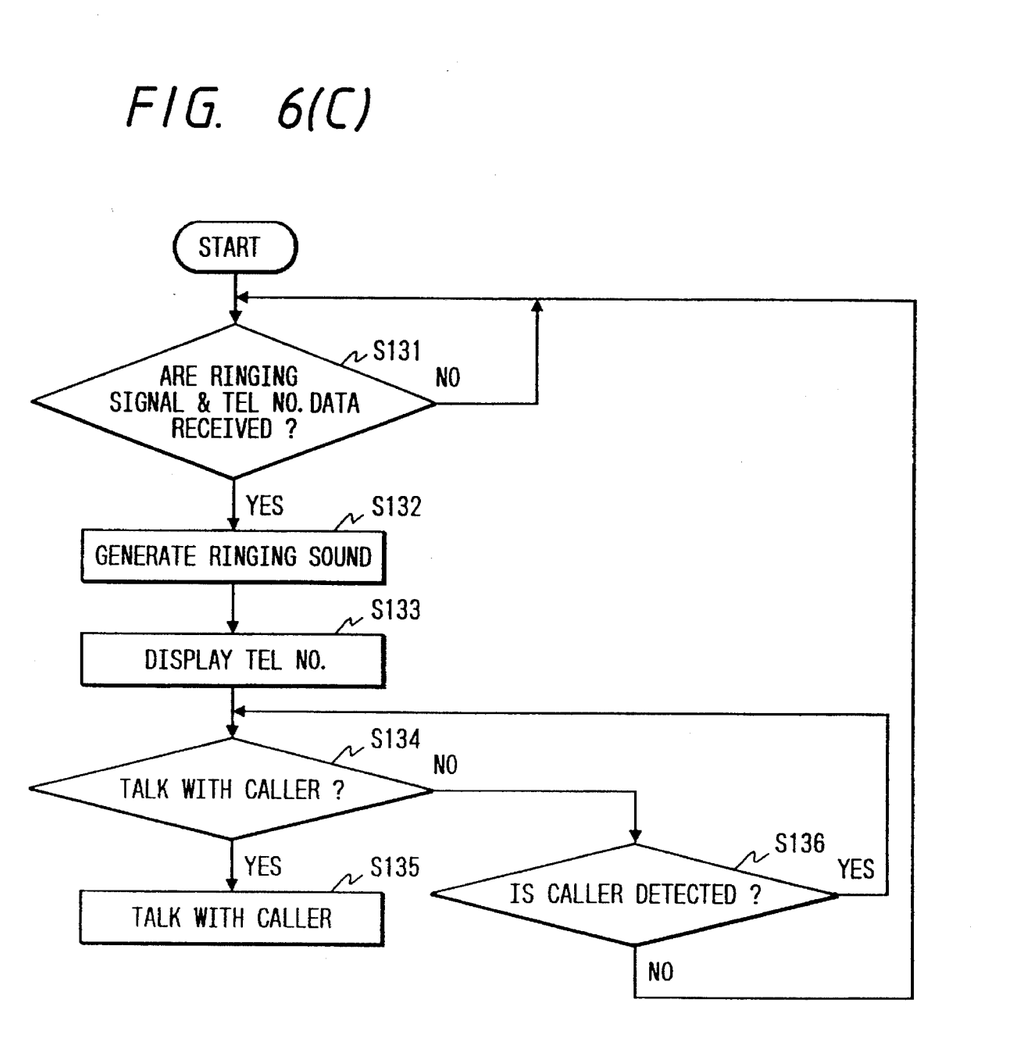

In FIG. 5, reference numeral 42 represents an antenna; 43 a high-frequency signal receiving device; 44 a receiving-signal amplifier; 45 a loudspeaker connected to the amplifier 44; 46 high-frequency signal transmitting device; 47 a transmitting-signal amplifier connected to the device 46; 48 a microphone connected to the amplifier 47; 49 a control device formed by a microcomputer; 50 an operation device; and 51 a switch for changing a state of the mobile unit among an off-state, a wait state and a busy state.

Additionally, reference numeral 52 represents a display device connected to the control device 49 for displaying a telephone number indicated by data sent from the fixed unit; and 53 a telephone ringer connected to the control device 49 for generating a ringing sound.

Hereinafter, an operation of the cordless telephone having the above described configuration will be described in detail.

First, regarding a case where a telephone-answering-machine portion (namely, an answering portion) including the OGM sender 34 and the ICM recorder 35 is in an off-state and the mobile unit is in a wait state, an operation of the cordless telephone will be described hereinbelow.

When a signal representing calling phone number data, as well as a ringing signal, is input from the telephone line 26 in step S101, the ringing-signal detecting device 28 detects a ringing signal and the calling-telephone-number detecting device 40 detects the calling-telephone-number data and outputs the detected calling-telephone-number data to the control device 37 in step S102.

Then, the control device 37 causes the high-frequency signal transmitting device 33 to transmit a signal representing the calling-telephone-number data and the ringing signal, which are input thereto, to the mobile unit in step S103.

When this signal is received by the high-frequency signal receiving device 43 in step S104, the control device 49 causes the display device 52 to display the telephone number indicated by this signal in step S105 and then causes the ringer 53 to generate a ringing sound in step S106.

Next, regarding a case where the answering portion is in a wait state and on the other hand the mobile unit is in a standby state, an operation of the cordless telephone will be described hereinbelow.

When a signal representing calling phone number data, as well as a ringing signal, is input from the telephone line 26, the ringing-signal detecting device 8 detects a ringing signal and the calling-telephone-number detecting device 40 detects the calling-telephone-number data and outputs the detected calling-telephone-number data to the control device 37 in step S111. At this stage, the fixed unit does not produce a ringing sound.

Then, the control device 37 compares a telephone number indicated by the detected calling-telephone-number data with a telephone number indicated by data preliminarily stored in the storage device 38 in step S112. If the former telephone numbers does not match the latter telephone number, the control device 37 causes the high-frequency signal transmitting device 33 to transmit a signal representing the input calling-telephone-number data in step S113.

When this signal is received by the high-frequency signal receiving device 43 of the mobile unit, the control device 49 causes the display device 52 to display the telephone number indicated by the calling-telephone-number data. At this stage, the mobile unit does not produce a ringing sound.

Thereafter, when ringing signals are input from the telephone line 26 the predetermined number of times in step S114, the control device 37 makes the interface device 27 close line connection (namely, establish the connection between the calling and called phones through the telephone lines 26) in step S115, similarly as in case of the conventional telephone set. Then, the control device 37 gets the OGM sender 34 to transmit an OGM in step S116. Upon completion of the transmission of the OGM, the control device 37 has the ICM recorder 35 record a voice signal representing the caller's voice, which is input from the telephone line 26, in step S117.

Hereupon, the user of the mobile unit of the cordless telephone can monitor the caller's voice by operating the mobile unit. The user can immediately communicate with the caller by changing the state of the mobile unit to a busy state by operating the switch 51 if the user feel this necessary.

Meanwhile, in case where it is detected in step S102 that the telephone number indicated by the data input to the control device 37 matches the telephone number preliminarily stored in the storage device 38, the control device 37 controls and causes the high-frequency signal transmitting device 33 to transmit the ringing signal to the mobile unit in step S120 and moreover transmit a signal representing the calling-telephone-number data thereto in step S121.

The ringing signal and the signal representing the calling-telephone-number data are received by the receiving device 43 of the mobile unit in step S131. Then, the received signals are output to the control device 49 therefrom. In response to these signals, the control device 49 causes the ringer 53 to generate a ringing sound in step 132 and moreover causes the display device 52 to display the telephone number indicated by the calling-telephone-number data in step S133.

Thus the user of the mobile unit can notice from the ringing sound that a call is given by the specific caller preliminarily registered at the storage device of the telephone. Furthermore, the user can confirm from the telephone number displayed in the display device who the caller is. When the user changes the state of the mobile unit to a busy state by operating the switch 51 in step S134 after the confirmation, he can communicate with the caller in step S135.

As described above, in case of this embodiment, neither the fixed unit nor the mobile unit generates a ringing sound if a call is not given by the preliminarily registered calling subscriber. Thereby, this embodiment can prevent the user from making an unnecessary response to a call given by a caller other than the specific calling subscriber. This function is very advantageous, for instance, in case where the user is going to concentrate his mind upon his work. Namely, the user can be immersed in his work without being disturbed by unnecessary calls. Moreover, similarly as in case of the first embodiment, the answering portion of the second embodiment automatically operates when ringing signals are input thereto the predetermined number of times. Thereby, the user can respond to an incoming call from the specific calling subscriber after the ringing sounds of the predetermined number are generated. Furthermore, in case where a call is made by the important party preliminarily registered in the telephone, a ringing sound is generated and the telephone number of the calling party is displayed in the mobile unit. Consequently, the user can immediately respond only to calls from the important parties.

Incidentally, in case of the second embodiment, the telephone number of the calling party is displayed in the mobile unit. However, the name of the specific calling party may be preliminarily stored in the storage device in addition to the phone number thereof. Further, in case where the telephone number of the calling party indicated by the calling-telephone-number data input from the telephone line 26 matches the telephone number preliminarily stored in the storage device 38, the name of the calling party corresponding to the telephone number may be displayed in the mobile unit, along with the telephone number in step S136 as illustrated in FIG. 6(C). Thereby, it can be known more easily who the calling party is.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A telephone set connected to at least one telephone line, comprising:

a fixed unit having:

ringing-signal detecting means for detecting a ringing signal input through the telephone line;

telephone number detecting means for detecting telephone number data representing a telephone number of a calling party, which is input from the telephone line; and transmitting means for transmitting a radio signal representing the telephone number data detected by the telephone number detecting means and a ringing signal; and a mobile unit having:

receiving means for receiving the radio signal transmitted from the transmitting means;

display means for displaying the telephone number of a calling party, which is indicated by the telephone number data represented by the radio signal received by the receiving means; and ringing-sound generating means for generating a ringing sound, wherein the fixed unit further comprises:

interfacing means for establishing a connection between the telephone set and a calling telephone through the telephone line;

telephone-answering means for transmitting an outgoing message to the telephone line and for recording a voiced incoming message of the calling party, which is input from the telephone line;

telephone number storing means for storing the input telephone number data;

ringing-sound generating means for generating a ringing sound according to the ringing signal detected by the ringing-signal detecting means; and control means for controlling the ringing-sound generating means to prevent the generation of a ringing sound according to tho ringing signal when the telephone number data detected by the telephone number detecting means does not match the telephone number data stored in the telephone number storing means, for controlling the interfacing means to establish a connection between the telephone set and the calling telephone, to accept a call sent from the calling party, and activating the telephone-answering means when no telephone number data is detected by the telephone number detecting means and a predetermined period of time expires since the telephone set has been called, and for controlling the ringing-sound generating means of the fixed unit to cause the generation of a ringing sound when the telephone number data detected by the telephone number detecting means matches the telephone number data stored in the telephone number storing means, and wherein the mobile unit further includes control means for controlling the ringing-sound generating means of the mobile unit to prevent the generation of a ringing sound when the telephone number data is not detected, and when the telephone number data detected by the telephone number detecting means does not match the telephone number data stored in the telephone number storing means, and to generate a ringing sound in response to the ringing signal when the telephone number data detected by the telephone number detecting means of the fixed unit matches the telephone number data stored in the telephone number storing means of the fixed unit.

2. A telephone set for handling a call comprising:

telephone number storing means for storing telephone number data representing telephone numbers of predetermined calling parties;

ringing-signal detecting means for detecting a ringing signal;

telephone number detecting means for detecting telephone number data representing a telephone number of a call-originator;

ringing-sound generating means for generating a ringing sound according to the detected ringing signal;

interfacing means for establishing a connection between the telephone set and a calling telephone through telephone line;

telephone-answering means for transmitting an outgoing message to the telephone line and for recording a voiced incoming message of the call-originator;

control means for preventing the ringing-sound generating means from generating the ringing sound on receiving the ringing signal until the call-originator is identified as one of the predetermined calling parties, and for controlling the interfacing means to establish the connection and to activate the telephone-answering means after a predetermined period without detecting telephone number data or identifying the detected telephone number data as the stored telephone number data.

3. A telephone set for handling a call comprising:

telephone number storing means for storing telephone number data representing telephone numbers of predetermined calling parties;

ringing-signal detecting means for detecting a ringing signal;

telephone number detecting means for detecting telephone number data representing a telephone number of a call-originator;

ringing-sound generating means for generating a ringing sound according to the detected ringing signal;

interfacing means for establishing a connection between the telephone set and a calling telephone through telephone line;

telephone-answering means for transmitting an outgoing message to the telephone line and for recording a voiced incoming message of the call-originator; and control means for preventing the ringing-sound generating means from generating the ringing sound on receiving the ringing signal until the call-originator is identified as one of the predetermined calling parties, for controlling the ringing-sound generating means to generate a first ringing sound, controlling the interfacing means to establish the connection, and activating the telephone-answering means after a predetermined period without detecting telephone number data or identifying the detected telephone number data as the stored telephone number data, and for controlling the ringing-sound generating means to generate a second ringing sound on identifying the detected telephone number data as the stored telephone number data.

* * * * *